United States Patent [19]

Webb et al.

[11] Patent Number: 5,082,563

[45] Date of Patent: Jan. 21, 1992

[54] METHODS FOR CLEANING UP LIQUIDS USING ABSORBENT PELLETS

[75] Inventors: John L. Webb, Richmond; Robert D. Kilgore, Rosharon; Shitalprasad N. Patil, Houston, all of Tex.

[73] Assignee: International Cellulose, Inc., Houston, Tex.

[21] Appl. No.: 383,167

[22] Filed: Jul. 20, 1989

[51] Int. Cl.⁵ ............................................. C02F 1/28
[52] U.S. Cl. ................................... 210/631; 210/663; 210/691; 210/922; 210/924
[58] Field of Search ............ 210/671, 680, 691, 242.4, 210/924, 631, 663, 922

[56] References Cited

U.S. PATENT DOCUMENTS

| | | |
|---|---|---|
| 12,882 | 5/1855 | Weiser . |
| 377,208 | 12/1887 | Sewall . |
| 1,718,507 | 6/1929 | Wenzel et al. . |
| 1,978,125 | 10/1934 | Bennett .................... 91/68 |
| 2,470,641 | 5/1949 | Portz ........................ 252/62 |
| 2,553,781 | 5/1951 | Oliver ...................... 117/137 |
| 3,027,326 | 3/1962 | Moffett ..................... 252/62 |
| 3,556,698 | 1/1971 | Tully et al. ................ 210/680 |
| 3,607,741 | 9/1971 | Sohnius ..................... 210/680 |
| 3,980,566 | 9/1976 | Peterson .................... 252/430 |
| 4,187,983 | 2/1980 | Boyer ......................... 239/9 |
| 4,226,711 | 10/1980 | Cain et al. ................. 210/691 |
| 4,343,680 | 8/1982 | Field et al. ................ 162/100 |
| 4,360,440 | 11/1982 | Boyer et al. ............... 252/62 |
| 4,780,518 | 10/1988 | Ceaser ....................... 527/300 |
| 4,829,045 | 5/1989 | Fransham .................. 210/242.4 |
| 4,923,121 | 5/1990 | Boyer ........................ 239/434.5 |

FOREIGN PATENT DOCUMENTS

| | | |
|---|---|---|
| 1107267 | 8/1981 | Canada . |
| 0039522 | 11/1981 | European Pat. Off. . |
| 0094363 | 11/1983 | European Pat. Off. . |
| 0115898 | 9/1984 | European Pat. Off. . |
| 0223431 | 5/1987 | European Pat. Off. . |
| 0331207 | 9/1989 | European Pat. Off. . |
| 1542263 | 5/1970 | Fed. Rep. of Germany . |
| 2205641 | 11/1972 | Fed. Rep. of Germany . |
| 272568C2 | 12/1978 | Fed. Rep. of Germany . |
| 2162689 | 9/1971 | France . |
| 118199 | 2/1947 | Sweden . |

OTHER PUBLICATIONS

SorbaSoly, Omni Div. of Ajax, Technical Bulletin.
No Slick Fix, Scientific American, Sept. 1989, p. 34.

(List continued on next page.)

Primary Examiner—Ivars Cintins
Attorney, Agent, or Firm—Guy McClung

[57] ABSTRACT

Method for absorbing, removing, and for cleaning up a first liquid floating on or in a second liquid, the method employing absorbent pellets which, in preferred embodiments, have a particular size, density, and configuration. The method can include steps of introducing the pellets onto or into the floating liquid to be removed; in preferred embodiments additional steps of agitation and spraying or applying a surfactant can be employed. The pellets containing the liquid to be removed can be removed from the surface of the second liquid; from an intermediate location above the lowermost depth of the liquid; or from the bottom level of the liquid or the bottom of the container or reservoir holding the liquid. A method for making pellets for cleaning up a first liquid floating on or in a second liquid; and a method for making pellets for absorbing a combustible material to produce fuel pellets. A method for producing fuel pellets. A fuel pellet produced by fabricating a pellet, preferably a cellulose pellet, and having it absorb combustible material. A recovery pellet, preferably a cellulose pellet, for absorbing a liquid and from which the absorbed liquid can then be recovered. A pellet, preferably a cellulose pellet, for absorbing a first liquid floating on or in a second liquid. In the preferred embodiments of the methods utilizing a surfactant, the surfactant assists in sinking the material and it can speed up the sinking. Methods for controlling a first liquid (e.g., oil) floating on or in a second liquid (e.g., water or saltwater). A compressed pellet, preferably made from newsprint paper, useful in such methods.

11 Claims, 4 Drawing Sheets

OTHER PUBLICATIONS

NERAC report 002,207, Question No.-615,466, May 24, 1989.
Cincinnati Fiber, Inc., "Material Safety Data Sheet", 12/28/87.
International Cellulose Corp., "Celbar 2", 2/88.
International Cellulose Corp., "k-13 fc", 1987.
Cincinnatii Fiber Inc., "Cell Dry (tm)-Gobbler (tm)" prior to 5/88.
Absorptive Technology Inc., "Kitty Flush," prior 5/88.
Oil-Dri Corp., "Oil Dri," prior to 5/88.
Balcones Mineral Corp., "Absorb-N-Dry," prior to 5/88.
J. V. Manufacturing Co., "Hydrovac," 1987.
New Pig Corp., "Only a Pig Can Eat All This," 1987.
Conwed Corp., "Conwed Industrial Sorbent Products," 1984.
Sorbent Products Co., "The SPC Solution", prior to 5/88.

METHODS FOR CLEANING UP LIQUIDS USING ABSORBENT PELLETS

BACKGROUND OF THE INVENTION

1. Field of the Invention

This invention relates to methods for cleaning up a liquid floating on or in another liquid and to absorbent pellets useful in such methods. In one embodiment this invention relates particularly to methods for cleaning up oil spills in salt water using cellulose pellets of a preferred size, configuration and density. This invention relates to methods for making absorbent pellets and to the pellets themselves.

2. Description of the Prior Art

Various methods, materials, and apparatuses have been used to clean up liquid spills such as oil spills. These methods, materials, and apparatuses are ineffective at best and costly, and non-productive at worst. Several weeks after the recent Exxon Valdez oil spill, only a small percentage of the spilled oil had been cleaned up. Even with spills of lesser magnitude the clean up devices are complex and expensive and the methods are ineffective.

There has long been a need for a quick and efficient method for cleaning up spilled hazardous, obnoxious, or toxic materials, including but not limited to oil, chemicals, and petroleum products.

There has long been a need for a method for cleaning oil spills which itself does not result in other environmental or disposal problems. There has long been a need for a method for cleaning up material spills which permits recovery or re-use of some of the spilled material. There has long been a need for a product for use in such methods.

In accordance with the duty of candor before the Patent and Trademark Office, the following are disclosed:

U.S. Pat. No. 4,360,440, commonly owned with this application, discloses an insulating mixture with cellulose for fiber, water, and adhesive.

U.S. Pat. No. 4,187,983, commonly owned with this application, discloses a spray nozzle for spraying a multi-component insulating mixture of insulating fibers and adhesive.

U.S. patent application Ser. No. 07/259,968 commonly owned with this application, discloses a nozzle for spraying insulating material mixtures including cellulose fibers.

U.S. Pat. No. 3,027,326 discloses a shredded fiber insulating material treated to improve resistance to charring and to provide a lower coefficient of heat transfer.

U.S. Pat. No. 2,553,731 discloses flame resistant cellulose fibers.

U.S. Pat. No. 2,470,641 discloses a cellulose insulation material made from disintegrated newspaper and boric acid powder.

U.S. Pat. No. 1,978,125 discloses a method for applying an insulation mixture including cellulose (paper) fiber.

U.S. Pat. No. 1,718,507 discloses a method for applying an insulating mixture including cellulose material.

U.S. Pat. No. 374,208 discloses a process for preserving wood.

U.S. Pat. No. 12,882 discloses an insulation material including macerated waste paper and forming a paste.

Cincinnati Fiber, Inc., "Material Safety Data Sheet," 1987 discloses cellulose fiber produced from recycled newspaper for use as an absorbent.

International Cellulose Corporation (assignee of present invention and this application), "Celbar 2 loose fill cellulose insulation," February 1988, discloses insulating cellulose fibers.

International Cellulose Corporation, "K-13 fc ceiling systems," 1987 discloses an insulating material including cellulose fibers.

Cincinnati Fiber, Inc., "Cell Dry (TM)-Gobbler (TM)," dated prior to May 1988, discloses absorbent tubes with a granular absorbent having a wicking action suitable for absorbing oil or other liquids.

Oil-Dri Corporation of America, "Oil-Dri," (product bag) 1983, discloses ground clay for soaking up liquid spills on surfaces, including oil spills on floors, workbenches, and driveways.

Absorptive Technology, Inc., "Kitty Flush," (product bag), dated prior to May 1988, discloses an absorbent cellulose fiber for, among other things, absorbing water and oil spills.

Balcones Mineral Corp., "Absorb-N-Dry," (product bag) dated prior to May 1988, discloses absorbent granular calcined clay for absorbing oil, grease, odors, moisture, and liquids.

J.V. Manufacturing Co., Inc., "Hydrovac," 1987 discloses a vacuum system for cleaning up spills of hazardous materials, including oil. The brochure mentions U.S. Pat. No. 4,194,978.

New Pig Corporation, "Only A Pig Can Eat All This," 1987, discloses devices with a superabsorbent material for cleaning up spills of hazardous materials.

Conwed Corp., "Conwed Industrial Sorbent Products," 1984, discloses sorbent devices with a water-resistant biodegradable natural fiber mat reinforced with polypropylene mesh which, after clean up can be wrung out to reclaim the absorbed material or can be incinerated.

Sorbent Products Co., Inc., "The SPC Solution," dated prior to May 1988, discloses devices and pads using a non-biodegradable sorbent material and Fiberperl, a combination of cellulose and perlite in particulate, boom, or pillow embodiments.

SUMMARY OF THE INVENTION

The present invention is directed to: methods for absorbing a first liquid floating on or in a second liquid by using absorbent pellets; to absorbent pellets; and to methods for making the pellets; and to pellets produced by the absorbtion method. One embodiment of an absorbing method according to this invention for use in cleaning up a first liquid floating on or in a second liquid includes the steps of introducing pellets, preferably made from cellulose, onto or into the first liquid which pellets absorb some or all of the first liquid and then sink beneath the location of the first liquid to a point at which they are recovered or to the bottom of the container, reservoir, or body of the second liquid. In another embodiment the pellets can be recovered from the location of the first liquid before they sink. In another embodiment of the method, a surfactant sprayed on the pellets may facilitate absorption of the first liquid and decrease the time necessary to cause sinking of the pellets.

In at least preferred embodiments, pellets according to this invention have a preferred range of densities. In other preferred embodiments pellets have a preferred range of sizes. In other preferred embodiments pellets have various preferred configurations. One specific preferred pellet has a preferred range of densities, a preferred range of sizes, and a preferred configuration.

One embodiment of a method for making cellulose pellets according to this invention includes the steps of preparing raw cellulose such as paper into a form that can be introduced to subsequent pelletizing steps. In one embodiment correctly sized cellulose particles are conditioned with water then fed to and through a pelletizing machine which produces pellets. In a preferred embodiment these pellets are then sized and shaped to desired specifications. Some or all of the undesirable pellets and particles (e.g., dust) can be removed. The resulting compressed pellets are useful in various methods.

There are, therefore, objects of at least preferred embodiments of the present invention as follows:

To provide a new, unique, useful, and nonobvious method for absorbing a first liquid floating in or on a second liquid; e.g., but not limited to, a method for cleaning up oil spills in fresh or salt water;

To provide new, unique, and nonobvious pellets for absorbing a first liquid floating on or in a second liquid; e.g., but not limited to cellulose pellets of a particular size, configuration, and density;

To provide new, unique, useful, and nonobvious methods for fabricating such pellets for use in such methods;

To provide new, unique, useful, and nonobvious methods for using such pellets and such methods to produce a pellet which has absorbed combustible material or petroleum products and can subsequently be used as a fuel pellet or can be introduced into a recovery process for recovering the petroleum product, or to produce a pellet which can absorb a liquid and which can then be treated or handled to remove the liquid.

There are other objects of at least various preferred embodiments of the present invention as follows:

To provide a method for cleaning up oil spills in which the pellets used absorb oil floating on water and then sink to the bottom where they biodegrade.

To provide such a method which works well with either natural agitation of the water such as by wind or wave action or in which artificial agitation can be employed to facilitate absorbtion and to speed-up sinking of the pellets.

To provide a method in which pellets are recovered from a layer of oil or other material before they sink or before they come to rest on the bottom of the container or reservoir, either manually or by mechanical means.

To provide a method in which pellets can be used to absorb a combustible material such as crude oil and hold it at or near the surface of another liquid so that it (and the pellets) can be burned before it mixes with the other liquid or sinks.

To provide a method for producing a cellulose pellet for use in the other methods according to this invention, including the steps of grinding raw paper in mills to produce particles or pieces which are conditioned with water and metered to a pelletizing machine in which it is extruded to produce pellets of increased density; the pellets are dried, sized, and shaped.

To provide pellets useful in all of the methods described herein.

To satisfy the long-felt needs for a quick and efficient method for cleaning up spilled hazardous, toxic, or obnoxious materials such as chemicals, petroleum products, and crude oil.

To satisfy the long-felt need for a method for cleaning up material which permits recovery or re-use of some of the material.

To satisfy the long-felt need for a method for cleaning up such spills which itself does not result in other environmental or disposal problems.

To satisfy the long-felt need for a product useful in such methods.

To provide methods for controlling a first liquid floating in or on a second liquid; particularly oil floating on water.

To provide compressed absorbent pellets, preferably made from newsprint, which are designed and made to float or sink after absorbing an unwanted liquid, depending on the particular application.

The present invention recognizes and addresses the previously-mentioned long-felt needs and provides an elegant, creative and satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying materials. Although these descriptions are detailed to insure adequacy and aid understanding, this is not intended to prejudice that purpose of a patent which is to claim an invention no matter how others may later disguise it by variations in form or additions or further improvements. The claims at the end of this specification are intended for this purpose.

BRIEF DESCRIPTION OF THE DRAWINGS

So that the manner in which the above-recited features, advantages and objects of the invention, as well as others which will be better understood, a more particular description of the invention briefly summarized above may be had by reference to the detailed description of certain preferred embodiments thereof, and the materials which are illustrated in the appended photographs which form a part of this specification. It is to be noted, however, that the appended photographs illustrate perferred embodiments of the invention and are therefore not to be considered limiting of its scope, for the invention may admit to other equivalent and equally effective embodiments.

FIGS. 8–13 are prior art.

DESCRIPTION OF PREFERRED EMBODIMENTS

Figure 1:
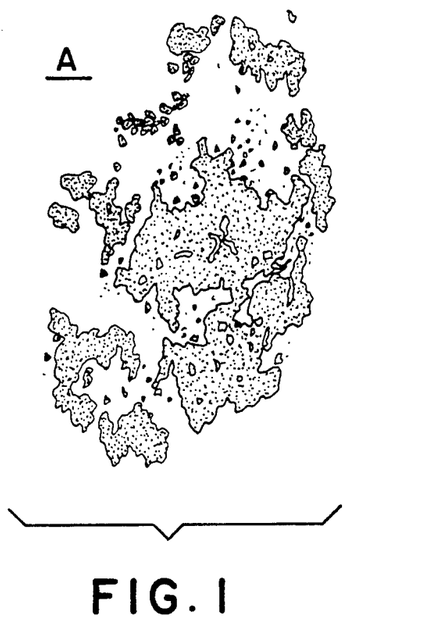
FIGS. 1–7 are photographs A–G of pellets according to the present invention.
Figure 2:
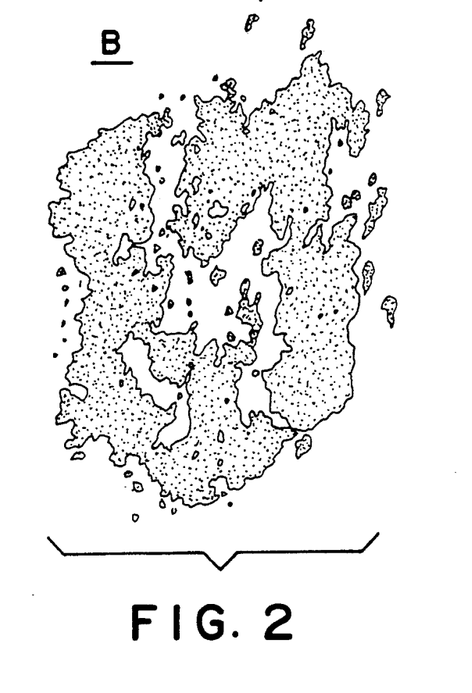
Figure 3:
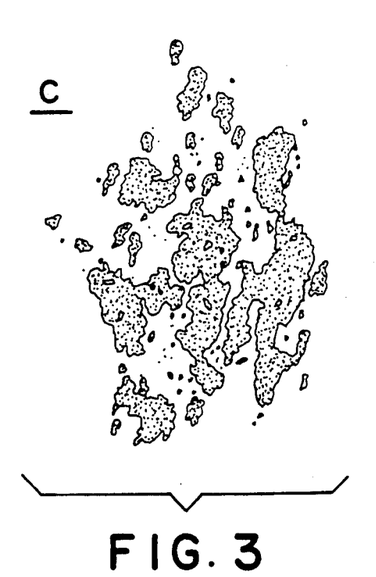
Figure 4:
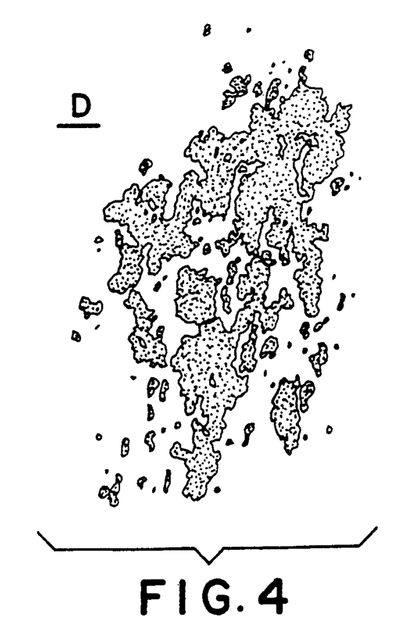
Figure 5:
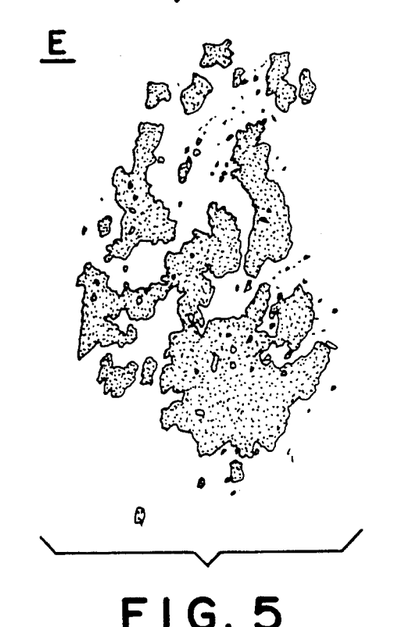
Figure 6:
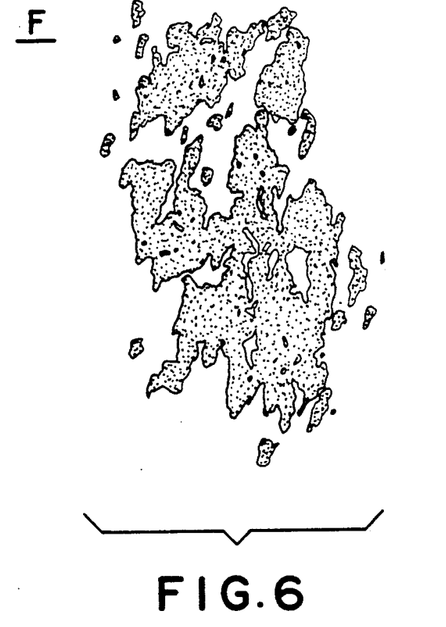
Figure 7:
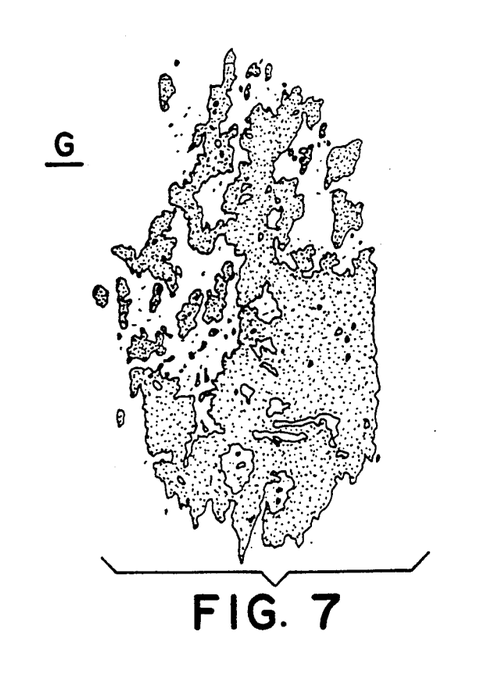
Figure 8:
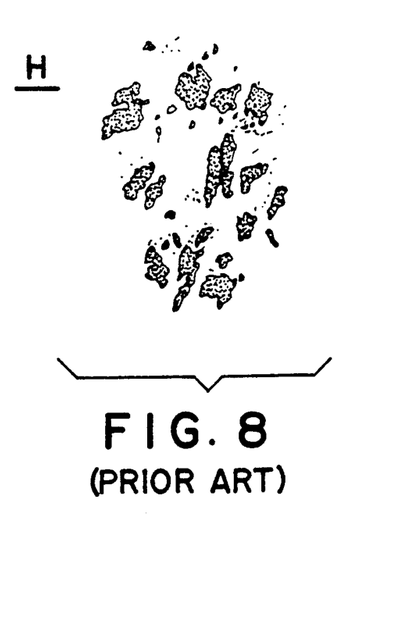
FIG. 8 is a photograph H showing Buckerfield's material.
Figure 9:
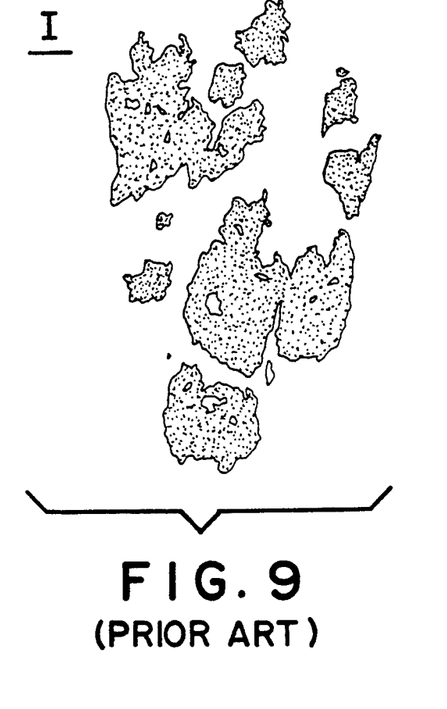
FIG. 9 is a photograph I showing Kitty Flush (TM) material.
Figure 10:
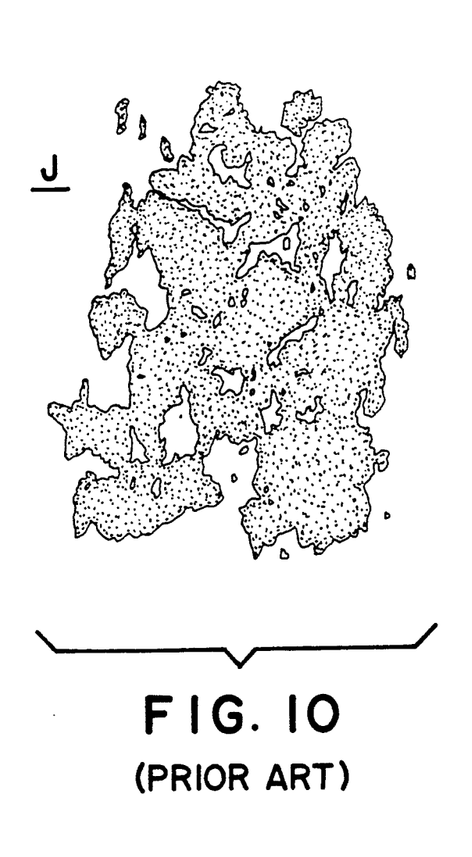
FIG. 10 is a photograph J showing Cincinnati Fiber absorbent material.
Figure 11:
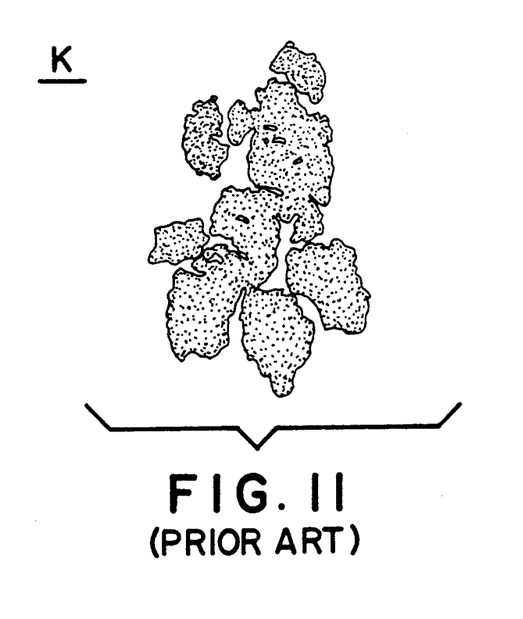
FIG. 11 is a photograph K showing International Cellulose's cellulose fiber (owner of this application).
Figure 12:
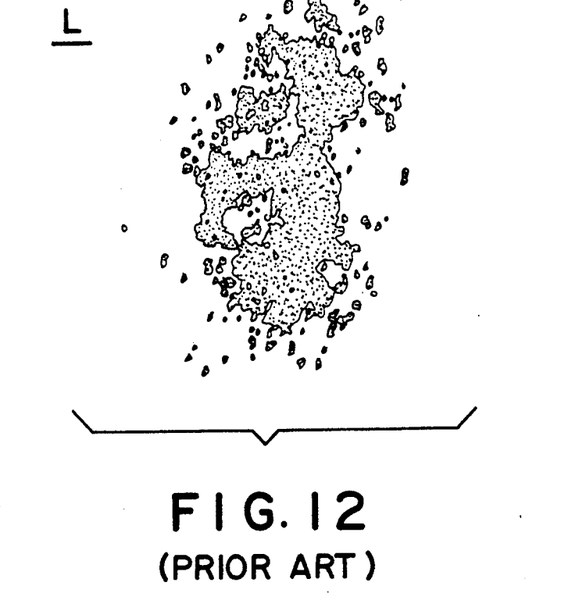
FIG. 12 is a photograph L showing Absorb-N-Dri granules.
Figure 13:
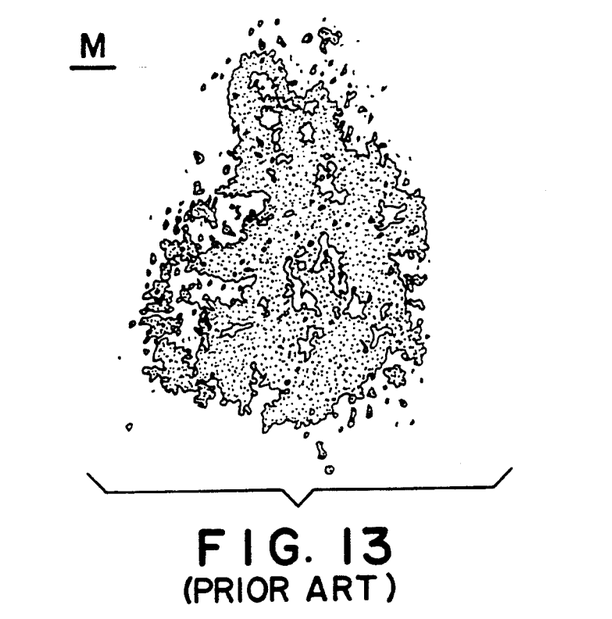
FIG. 13 is a photograph M showing Oil-Dri granules.

In one preferred embodiment of a process according to the present invention for producing absorbent pellets, paper is ground up, preferably Kraft paper, cardboard, or newsprint, with newsprint most preferred. The newsprint is fed into a commercially available first stage mill that reduces the paper to pieces in the range of about one inch to about one and a half inches. These pieces are then fed to a finishing mill where they are further reduced to pieces in the range of about one-eighth inch to one-fourth inch in size. These pieces of newsprint are then conditioned with a water spray. It is preferred that the moisture content be in the range of about 12% to about 14% by weight, with 13% preferred.

The conditioned newsprint material is then fed into a special pelletizing machine (commercially available model machine 26-300 made by The Sprout Bauer Company), that extrudes the material through a die to form pellets. The conditioned newsprint at about four to seven pounds per cubic foot is fed to the pelletizing machine to produce pellets which are in the preferred density range of about 37 to 47 pounds per cubic foot. The size of the pellets fed to the machine varies. In one embodiment the best size has been determined to have a diameter in the preferred range of about one-eighth inch to about one-fourth inch and a length in the preferred range of about one-fourth inch to about three-fourths inch long; the preferred density for this pellet is about 42 pounds of cellulose material per cubic foot. It is preferred that these pellets be dried and the preferred range of moisture content after drying is from about 8% moisture by weight to about 10% moisture by weight.

The dried cellulose pellets are then fed to a roller mill for sizing and shaping (commercially available model FRC 936 made by the Roskamp Company). The action of the roller mill produces an irregularly shaped pellet along with dust and particles of undesired size. By using a shaker screen, the undesired materials can be separated. In one preferred embodiment, the best density for a cellulose pellet for absorbing oil is in the density range of about 20 pounds of cellulose material per cubic foot to about 30 pounds per cubic foot. The irregularity of shape of this preferred embodiment is a somewhat flattened shape with more surface area than the shape of generally cylindrical non-flattened material of the prior art. Although the type and degree of irregularity as compared to a smooth cylindrical shape has not been quantified, applicants' pellets maintain their position in a first liquid to be absorbed which is floating on a second liquid; the pellets of desired density maintain their position while they are absorbing the first liquid and, in one embodiment, sink in and through the first liquid after absorbing some of the first liquid. The pellets need not become completely saturated with the first liquid; however, they should not be of such a configuration or of such a light density that they float on top of the first liquid without absorbing it or absorbing only an insignificant amount of it. Applicant's pellets cover the spectrum up to, but not including, pellets that sink immediately and, at the other end of the spectrum up to, but not including, pellets that float on the first liquid as described above. Of course sinking and floating can occur with different pellets on different first liquids. The preferred pellets (A, C, E) described above work well with a first liquid which is oil (e.g., crude oil or SAE 90 oil) floating on salt water. Configuration, size, and density can be varied depending on the nature of the first and second liquids.

To present the characteristics and qualities of certain preferred embodiments of pellets and methods according to the present invention, a study was conducted as reflected in Tables I, II, and III. Columns A through G represent data for cellulose pellets according to embodiments of the present invention. Column H presents data for Buckerfield material which is made from cellulose material and commercially available as Kitty Litter (TM). Column I presents data for low-density relatively flat pieces made from cellulose material and commercially available as Kitty Flush (TM). Column K presents data for grey fiber which is made from cellulose and is commercially available as insulation material.

Styrofoam cups were used as containers for salt water onto whose surface was introduced either SAE 90 grade oil or crude.

Each type of pellet was introduced into and onto each type of oil floating on 140 cc's of salty water in a cup which could hold about 200 cc's of liquid. One teaspoon of oil was poured slowly over the water in each cup. grams; one teaspoon of the viscous crude oil weighed about 4.23 grams). The surface area of the created oil films or slicks in the cups was about 4.91 square inches.

8 grams of each type of absorbent material were spread over the oil in each cup so that each type of absorbent material was used with each type of oil. At regular intervals of time, observations were made regarding the amount of oil absorbed and the amount of absorbent material which had sunk or was still on or in the oil.

Table I presents data for a testing situation in which the water/oil combination was at a temperature of 23 degrees Centigrade and the pH of the water was 7.68. After about 18 hours some of the materials were still floating on the surface of the water/oil combination; but a slight vibration of the cups caused the sinking of virtually all these floating materials.

Table II presents data for a testing situation in which the temperature of the water/oil combination was about 9 degrees Centigrade and the water pH was 8.02. After 20 hours the temperature had risen to 24 degrees Centigrade and some of the materials were still floating; again, a slight vibration caused them to sink.

Table III presents data on the densities of the various materials.

TABLE I

TEST: 1 ABSORPTION OF OIL/WATER BY A,B,C,D,E,F,G,H & I PELL
DATE: 5-3-89 & 5-4-89. TIME STARTED: 2:00 P.M., TEMPERATURE OF OIL/WATER = 23 DEGREES C.;
pH OF WATER = 7.83; WEIGHT OF SAE 90 OIL = 5.15 GM; WEIGHT OF VISCOUS OIL = 4.23 GM;
AREA OF OIL SPREAD = 32 CM$^2$; 140 CM$^3$ WATER USED

| TIME & DATE | TYPE OF OIL | A | B | C | D | E |
|---|---|---|---|---|---|---|
| 2.30 PM 05-03-89 | SAE 90 | 90% ABSORBED | 85% ABSORBED | 100% ABSORBED | 95% ABSORBED | 100% ABSORBED |
| | | 0% SANK | 0% SANK | 5% SANK | 0% SANK | 10% SANK |
| | VISCOUS | 90% ABSORBED | 80% ABSORBED | 97% ABSORBED | 97% ABSORBED | 97% ABSORBED |

TABLE I-continued

TEST: 1 ABSORPTION OF OIL/WATER BY A,B,C,D,E,F,G,H & I PELL
DATE: 5-3-89 & 5-4-89. TIME STARTED: 2:00 P.M., TEMPERATURE OF OIL/WATER = 23 DEGREES C.;
pH OF WATER = 7.83; WEIGHT OF SAE 90 OIL = 5.15 GM; WEIGHT OF VISCOUS OIL = 4.23 GM;
AREA OF OIL SPREAD = 32 CM$^2$; 140 CM$^3$ WATER USED

| Time | Type of Oil | A | B | C | D | E |
|---|---|---|---|---|---|---|
| 3.15 PM 05-03-89 | SAE 90 | 10% SANK 100% ABSORBED | 0% SANK 100% ABSORBED | 10% SANK 100% ABSORBED | 5% SANK 100% ABSORBED | 20% SANK 100% ABSORBED |
| | VISCOUS OIL | 10% SANK 100% ABSORBED | 5% SANK 100% ABSORBED | 40% SANK 100% ABSORBED | 5% SANK 100% ABSORBED | 40% SANK 100% ABSORBED |
| 3.45 PM 05-03-89 | SAE 90 | 20% SANK 20% SANK | 10% SANK 10% SANK | 30% SANK 55% SANK | 15% SANK 10% SANK | 50% SANK 60% SANK |
| | VISCOUS OIL | 60% SANK | 15% SANK | 45% SANK | 20% SANK | 65% SANK |
| 4.25 PM 05-03-89 | SAE 90 | 25% SANK | 15% SANK | 60% SANK | 13% SANK | 65% SANK |
| | VISCOUS OIL | 65% SANK | 20% SANK | 50% SANK | 35% SANK | 70% SANK |
| 4.55 PM 05-03-89 | SAE 90 | 30% SANK | 20% SANK | 60% SANK | 15% SANK | 70% SANK |
| | VISCOUS OIL | 75% SANK | 40% SANK | 55% SANK | 50% SANK | 75% SANK |
| 5.25 PM 05-03-89 | SAE 90 | 35% SANK | 25% SANK | 65% SANK | 15% SANK | 75% SANK |
| | VISCOUS OIL | 80% SANK | 50% SANK | 55% SANK | 50% SANK | 78% SANK |
| 5.55 PM 05-03-89 | SAE 90 | 35% SANK | 25% SANK | 65% SANK | 17% SANK | 75% SANK |
| | VISCOUS OIL | 85% SANK | 65% SANK | 55% SANK | 55% SANK | 80% SANK |
| 8.00 AM 05-04-89 | SAE 90 | 35% SANK | 25% SANK | 65% SANK | 20% SANK | 75% SANK |
| | VISCOUS OIL | 87% SANK | 75% SANK | 55% SANK | 60% SANK | 80% SANK |

| TIME & DATE | TYPE OF OIL | F | G | H* | I** |
|---|---|---|---|---|---|
| 2.30 PM 05-03-89 | SAE 90 | 100% ABSORBED 0% SANK | 99% ABSORBED 0% SANK | 100% ABSORBED 70% SANK | 100% ABSORBED 85% SANK |
| | VISCOUS OIL | 97% ABSORBED 10% SANK | 97% ABSORBED 10% SANK | 93% ABSORBED 90% SANK | 98% ABSORBED 98% SANK |
| 3.15 PM 05-03-89 | SAE 90 | 100% ABSORBED 0% SANK | 100% ABSORBED 5% SANK | 100% ABSORBED 85% SANK | 100% ABSORBED 100% SANK |
| | VISCOUS OIL | 100% ABSORBED 30% SANK | 100% ABSORBED 75% SANK | 100% ABSORBED 98% SANK | 100% ABSORBED 100% SANK |
| 3.45 PM 05-03-89 | SAE 90 | 0% SANK | 10% SANK | 90% SANK | 100% SANK |
| | VISCOUS OIL | 40% SANK | 80% SANK | 98% SANK | 100% SANK |
| 4.25 PM 05-03-89 | SAE 90 | 0% SANK | 12% SANK | 90% SANK | 100% SANK |
| | VISCOUS OIL | 40% SANK | 80% SANK | 98% SANK | 100% SANK |
| 4.55 PM 05-03-89 | SAE 90 | 0% SANK | 15% SANK | 90% SANK | 100% SANK |
| | VISCOUS OIL | 55% SANK | 85% SANK | 98% SANK | 100% SANK |
| 5.25 PM 05-03-89 | SAE 90 | 0% SANK | 17% SANK | 90% SANK | 100% SANK |
| | VISCOUS OIL | 60% SANK | 85% SANK | 98% SANK | 100% SANK |
| 5.55 PM 05-03-89 | SAE 90 | 0% SANK | 20% SANK | 90% SANK | 100% SANK |
| | VISCOUS OIL | 65% SANK | 90% SANK | 98% SANK | 100% SANK |
| 8.00 AM 05-04-89 | SAE 90 | 10% SANK | 20% SANK | 90% SANK | 100% SANK |
| | VISCOUS OIL | 90% SANK | 90% SANK | 98% SANK | 100% SANK |

*BUCKERFIELDS ABSORB MORE WATER THAN OIL FASTER AND SINK TO BOTTOM WITHIN 10 MINUTES. (so 5-8% OIL REMAINS ALONG THE EDGE OF THE STYROFOAM CUP.)
**THESE LOW DENSITY, FLAT CHIPS ABSORBS, ALSO, WATER MORE THAN OIL AND SINKS FASTER IN 15 MINUTES BELOW THE SURFACE.

TABLE II

TEST: 2 ABSORPTION OF OIL/WATER BY A,B,C,D,E,F,G,H,I,J & K
DATE: 5-4-89 & 5-5-89. TIME STARTED: 11.15 A.M., TEMPERATURE OF OIL/WATER = 9 DEGREES C.
pH OF WATER = 8.02; WEIGHT OF SAE 90 = 5.15 GM; WEIGHT OF VISCOUS OIL = 4.23 GM;
AREA OF OIL SPREAD = 32 CM$^2$; 140 CM$^3$ WATER USED

| TIME & DATE | TYPE OF OIL | A | | B | | C | | D | | E | |
|---|---|---|---|---|---|---|---|---|---|---|---|
| 11.45 AM 05-04-89 | SAE 90 | 90% | ABSORBED | 85% | ABSORBED | 87% | ABSORBED | 85% | ABSORBED | 85% | ABSORBED |
| | VISCOUS OIL | 95% | ABSORBED | 80% | ABSORBED | 90% | ABSORBED | 80% | ABSORBED | 85% | ABSORBED |
| 12.25 PM 05-04-89 | SAE 90 | 98% | ABSORBED | 90% | ABSORBED | 95% | ABSORBED | 90% | ABSORBED | 90% | ABSORBED |
| | VISCOUS OIL | 98% | ABSORBED | 90% | ABSORBED | 95% | ABSORBED | 90% | ABSORBED | 90% | ABSORBED |
| 1.05 PM 05-04-89 | SAE 90 | 98% | ABSORBED | 93% | ABSORBED | 98% | ABSORBED | 95% | ABSORBED | 95% | ABSORBED |
| | VISCOUS OIL | 98% | ABSORBED | 95% | ABSORBED | 97% | ABSORBED | 95% | ABSORBED | 95% | ABSORBED |
| 2.05 PM 05-04-89 | SAE 90 | 100% | ABSORBED | 98% | ABSORBED | 100% | ABSORBED | 98% | ABSORBED | 100% | ABSORBED |
| | VISCOUS OIL | 100% | ABSORBED | 97% | ABSORBED | 98% | ABSORBED | 98% | ABSORBED | 100% | ABSORBED |
| 3.05 PM 05-04-89 | SAE 90 | 100% | ABSORBED | 98% | ABSORBED | 100% | ABSORBED | 98% | ABSORBED | 100% | ABSORBED |
| | VISCOUS OIL | 100% | ABSORBED | 100% | ABSORBED | 100% | ABSORBED | 98% | ABSORBED | 100% | ABSORBED |
| 4.05 PM 05-04-89 | SAE 90 | 100% | ABSORBED | 100% | ABSORBED | 100% | ABSORBED | 100% | ABSORBED | 100% | ABSORBED |
| | VISCOUS OIL | 100% | ABSORBED | 100% | ABSORBED | 100% | ABSORBED | 100% | ABSORBED | 100% | ABSORBED |
| 4.50 PM 05-04-89 | SAE 90 | 100% | ABSORBED | 100% | ABSORBED | 100% | ABSORBED | 100% | ABSORBED | 100% | ABSORBED |
| | VISCOUS OIL | 100% | ABSORBED | 100% | ABSORBED | 100% | ABSORBED | 100% | ABSORBED | 100% | ABSORBED |
| 8.00 AM 05-05-89 | SAE 90 | 45% | SANK | 10% | SANK | 15% | SANK | 20% | SANK | 40% | SANK |
| | VISCOUS OIL | 50% | SANK | 30% | SANK | 40% | SANK | 25% | SANK | 55% | SANK |
| | SAE 90 | 60% | SANK | 40% | SANK | 50% | SANK | 55% | SANK | 65% | SANK |

| TIME & DATE | TYPE OF OIL | F | | G | | H* | | I** | | J | | K |
|---|---|---|---|---|---|---|---|---|---|---|---|---|
| 11.45 AM 05-04-89 | SAE 90 | 95% | ABSORBED | 95% | ABSORBED | 100% | ABSORBED | 100% | ABSORBED | 75% | ABSORBED | GREY FIBER IS LIGHTER |
| | VISCOUS OIL | 95% | ABSORBED | 90% | ABSORBED | 85% | SANK | 100% | SANK | 85% | ABSORBED | SO THE FIBERS IN CONTACT WITH THE OIL SURFACE ONLY |
| 12.25 PM 05-04-89 | SAE 90 | 95% | ABSORBED | 98% | ABSORBED | 100% | ABSORBED | 100% | ABSORBED | 80% | ABSORBED | ABSORBED THE OIL AND THE FIBERS ABOVE REMAINED DRY. |
| | VISCOUS OIL | 95% | ABSORBED | 92% | ABSORBED | 87% | SANK | 100% | ABSORBED | 70% | ABSORBED | THE ABSORBED FIBERS WERE FLOATING ON OIL |
| 1.05 PM 05-04-89 | SAE 90 | 97% | ABSORBED | 99% | ABSORBED | 100% | ABSORBED | 100% | ABSORBED | 85% | ABSORBED | |
| | VISCOUS OIL | 97% | ABSORBED | 95% | ABSORBED | 90% | SANK | SAME AS ABOVE | | 75% | ABSORBED | |
| 2.05 PM 05-04-89 | SAE 90 | 99% | ABSORBED | 99% | ABSORBED | 100% | ABSORBED | SAME AS ABOVE | | 90% | ABSORBED | |

TABLE II-continued

TEST: 2 ABSORPTION OF OIL/WATER BY A,B,C,D,E,F,G,H,I,J & K
DATE: 5-4-89 & 5-5-89. TIME STARTED: 11.15 A.M., TEMPERATURE OF OIL/WATER = 9 DEGREES C.
pH OF WATER = 8.02; WEIGHT OF SAE 90 = 5.15 GM; WEIGHT OF VISCOUS OIL = 4.23 GM;
AREA OF OIL SPREAD = 32 CM²; 140 CM³ WATER USED

| Date/Time | Oil | | | | | | Notes |
|---|---|---|---|---|---|---|---|
| 05-04-89 | VISCOUS OIL | 5% SANK | 5% SANK | 15% SANK | 95% SANK | 0% SANK | |
| | SAE 90 | 99% ABSORBED | 99% ABSORBED | 95% ABSORBED | 100% ABSORBED | 90% ABSORBED | |
| 3.05 PM 05-04-89 | VISCOUS OIL | 5% SANK | 5% SANK | 5% SANK | 95% SANK | 0% SANK | |
| | SAE 90 | 99% ABSORBED | 99% ABSORBED | 99% ABSORBED | SAME AS ABOVE | 95% ABSORBED | SAME AS ABOVE |
| 4.05 PM 05-04-89 | VISCOUS OIL | 5% SANK | 5% SANK | 5% SANK | 98% SANK | 0% SANK | |
| | SAE 90 | 99% ABSORBED | 99% ABSORBED | 99% ABSORBED | 100% ABSORBED | 92% ABSORBED | SAME AS ABOVE |
| | VISCOUS OIL | 20% SANK | 20% SANK | 40% SANK | SAME AS ABOVE | 0% SANK | GREY FIBER SPREAD ON OIL/ WATER SURFACE ABSORBS SOME |
| | SAE 90 | 100% ABSORBED | 100% ABSORBED | 100% ABSORBED | 100% ABSORBED | 95% ABSORBED | OIL AND FORMS MAT OF ABSORBED |
| 4.50 PM 05-04-89 | VISCOUS OIL | 30% SANK | 30% SANK | 30% SANK | 99% SANK | 0% SANK | FIBERS AND FLOATS. THE FIBERS |
| | SAE 90 | 100% ABSORBED | 100% ABSORBED | 100% ABSORBED | SAME AS ABOVE | 100% ABSORBED | ABOVE THAT MAT IS DRY. ONLY |
| | VISCOUS OIL | 30% SANK | 30% SANK | 50% SANK | 99% SANK | 5% SANK | 2-3 GRAMS OF FIBER OIL ABSORBED |
| | SAE 90 | 100% ABSORBED | 100% ABSORBED | 100% ABSORBED | 100% ABSORBED | 100% ABSORBED | EVEN AFTER 20 HOURS |
| 8.00 AM 05-05-89 | SAE 90 | 50% SANK | 50% SANK | 35% SANK | 99% SANK | 5% SANK | |
| | VISCOUS OIL | 45% SANK | 45% SANK | 50% SANK | 95% SANK | 20% SANK | 100% SANK |
| | | 80% SANK | 80% SANK | 85% SANK | 99% SANK | 90% SANK | 100% SANK |

*BUCKERSFIELD ABSORB WATER FASTER THAN OIL AND SINK TO BOTTOM WITHIN 10 MINUTES.
**THESE LOW DENSITY, FLAT CHIPS, ALSO, ABSORBED MORE WATER FASTER THAN OIL AND SANK BELOW THE SURFACE SO 8-10% SAE 90 OIL REMAINED FLOATING ON THE SURFACE. 25-30% VISCOUS OIL REMAINED AT THE EDGE OF CUP. J&K SANK BELOW THE SURFACE ONLY.

TABLE III

| NOS. | VOLUME CUBIC CENTIMETERS | WEIGHT GRAMS | DENSITY GRAMS CUBIC CENTIMETERS | DENSITY POUNDS CUBIC FEET |
|---|---|---|---|---|
| A | 196 | 67.59 | 0.3448 | 21.53 |
| B | 196 | 67.54 | 0.3446 | 21.51 |
| C | 196 | 63.76 | 0.3253 | 20.31 |
| D | 196 | 72.48 | 0.3698 | 23.09 |
| E | 196 | 63.58 | 0.3244 | 20.25 |
| F | 196 | 93.19 | 0.4755 | 29.68 |
| G | 196 | 91.17 | 0.4652 | 29.04 |
| H | 84 | 37.51 | 0.4465 | 27.88 |
| I | 196 | 26.16 | 0.1335 | 8.333 |
| J | 200 | 50.53 | 0.2527 | 15.77 |
| K | 200 | 7.96 | 0.0398 | 2.48 |

After two hours of such testing as reported in Tables I–III, it was discovered that under these conditions, absorption was faster and pellets sank faster in the warmer water at the lower pH with the lower density oil. After 18 to 20 hours of such testing, it became apparent that pellets sank more with the more viscous crude oil than in the SAE 90 oil. The Buckerfield material (type H) absorbed oil/water faster than the other materials and sunk to the bottom so relatively quickly (in about 10 minutes) that unabsorbed oil remained on the water's surface (about 8% to about 10% of the SAE 90 oil remained; about 15% to about 20% of the viscous oil remained). The flat pieces (type I) absorbed a significant amount of water and sank in about 20 minutes leaving behind about 10% of the SAE 90 oil and about 30% of the viscous oil.

The type C, F, and G pellets (Table I; Table II) of relatively high density (about 29 pounds of cellulose per cubic foot of pellets) were found to absorb oil faster than the other pellets. These pellets sank more in viscous oil than in SAE 90 oil.

Although the type A and B pellets had the same density (about 21.5 pounds of cellulose per cubic foot of pellets), the B pellets were smaller in size and surface area as compared to the A pellets. The B pellets absorbed oil and water more slowly than the A pellets and less of the B pellets sank than the A pellets.

All pellets can absorb *both* oil and water; but they can be preconditioned to absorb only oil or mostly oil by pretreating them with oil; e.g., spraying them with No. 2 diesel oil. Pellets treated in this way may not readily absorb water thus making them float on top of a first liquid, e.g., oil more readily so that a less dense pellet can be used (e.g., a pellet less dense than certain preferred pellets, a pellet less dense than 20 pounds of cellulose per cubic foot). It is preferred that pretreatment occur during the pellet manufacturing process, preferably prior to the final pelletizing step.

The type E, A, and C pellets performed better than the type B, D, and J (Cincinnati Fiber material) in SAE 90 oil—they absorbed more oil more quickly. Pellets of types A through G absorb the SAE 90 almost completely leaving little or no oil on the surface and about 1% of the oil around the edge of the cups, leaving the water looking clean. With the viscous oil, these pellets left about 2% to 3% of the oil behind around the edge of the cup. The grey fiber (type K) did not sink. These fibers were generally so light that they formed an agglomeration of fibers and floated on the surface. Fibers remaining above the agglomerated fibers did not absorb oil, even after about 18 to 20 hours. The fibers at the bottom of the agglomeration absorbed only about half of the oil.

The commercially available prior art Buckerfield's flushable cat litter (type H) is biodegradable and can absorb up to 150% of its own weight and it is described as useful for spilled oil.

The use of the word "pellet" herein includes a piece of material which functions as described to produce the desired results and is made by compressing cellulose material or its equivalent. Preferred pellets are irregular and have enough surface area to break the surface tension of a first liquid, e.g., oil, floating on a second liquid, e.g., water. In one embodiment the pellets can be pretreated with oil which makes them repel water so that a less dense pellet can be used for those applications in which sinking is not desired, i.e., in those applications in which the pellets after absorbing the first liquid are to be removed from the surface of the first liquid.

In various preferred embodiments of this invention, pellets are provided which can absorb liquid and from which the absorbed liquid can be recovered and subsequently disposed of or treated further or refined. For example, from pellets which have absorbed spilled crude oil, the crude oil can be extracted or squeezed out. Of course, the pellets can be recovered by any suitable manual or mechanical means from the surface, from beneath the surface, or from the bottom of the reservoir, bay, ocean, or container of the liquid. Recovered pellets can be disposed of without removing the absorbed liquid. Pellets which have absorbed a combustible material according to any of the previously described methods can be used as fuel or can be incinerated to dispose of them. Also, pellets in place on a first liquid floating on a second liquid can be set on fire to burn absorbed combustible material and to assist in the burning of liquid in which they are floating. It is also within the scope of this invention to provide agitation or vibration to a first liquid/second liquid combination to enhance either pellet absorption or sinking or both.

Regarding certain preferred embodiments in which the pellets sink after absorbing a material like oil, if the pellets and the oil will be biodegradable by natural causes, there may be no need to recover them.

In one preferred embodiment of a method according to this invention the use of a surfactant can decrease the amount of time for the pellets (which have absorbed a first liquid, such as oil) to sink. Using cups containing salty water with a heavy crude oil top film and cups containing salty water with a SAE 90 oil top film, pellets of types B through G (Table I) were sprinkled on the oil, one type of pellet per cup, a total of 10 cups. After 10 minutes, the bulk of the oil had been absorbed in each cup and about 2% to 5% of the pellets had sunk to the bottom of the cups. Then a 0.1% solution of a surfactant (commercially available Witconate AOS (TM) surfactant) was misted onto the top of the still-floating pellets. Immediately almost all of the remaining pellets combined with oil and fell to the bottom of the containers.

The relative absorption rates of different amounts of pellets, pellets of types A, C, E, F, and G according to the present invention were demonstrated, again using the previously described styrofoam cups as reservoirs and using four cups of each type of pellet, placing 2, 4, 6, and 8 grams of each type of pellet on the oil film (5.15 grams of SAE 90 oil) in each cup. Pellets A, C, E were 20–22 pounds per cubic foot; types E and F, 29 to 30 pounds per cubic foot.

Pellets of types G and F are generally heavier and more uniformly round than pellets of types A, C, and E, and pellets of types E and F were more round than types A, C, E. At 20 minutes after sprinkling the pellets on the liquid, the cups with 4 and 6 grams of pellets of types A, C, and E exhibited the best oil absorption with E being the best. The cups with 8 grams of pellets of types A, C, E, and F showed generally good oil absorption. The type G pellets did not perform as well as the other types at any given weight. Also, after the pellets of type G in the cup with 4 grams of pellets had sunk, stirring the pellets caused release of some of the absorbed oil, and it floated up to the surface. Less absorbed oil was released by pellets of type E in the cup with 4 grams of pellets. Such stirring did not result in the release of oil from the pellets in cups with 6 or 8 grams of pellets. All the cups with only 2 grams of pellets had free unabsorbed oil at 20 minutes after sprinkling the pellets. Slight agitation of the cups containing 2 grams of pellets resulted in almost no pellets sinking. Spraying surfactant on the pellets still floating after about 25 minutes resulted in the sinking of almost all the pellets in the cups with 4, 6, or 8 grams of pellets.

In testing the liquid retention of various types of cellulose fibers including Champions Mulch #1; Champions Mulch #2; Conwed Wood; Newsprint; Cardboard, 75% Newsprint/25% Cardboard; and 50% Newsprint/50% Cardboard; it was determined that 100% Newsprint was most absorbent and the mulches were the least absorbent. Regarding water absorption, tests revealed that the most absorbent material was Newsprint.

Mulch fiber was shown to be heavier compared to other fibers and it absorbed less water. Newsprint (100%) retained more water. Mulch retained the least.

By compressing cellulose material into pellets according to this invention, relatively more mass (higher density) is utilized in a smaller space to provide relatively more absorbability for a given volume and provide more control of a first liquid (e.g., spilled oil) floating on or in a second liquid (e.g., ocean water). However, in some embodiments, a density which results in premature pellet sinking is undesirable. Compressed pellets fashioned to provide control of an oil spill without sinking will facilitate recovery from the surface. Various biodegrading microorganisms that attack and degrade oil and other materials may be included in compressed pellets of this invention.

Thus it is seen that the products and methods of the present invention readily achieve the ends and advantages mentioned as well as other inherent therein. While certain preferred embodiments of the present invention have been described and illustrated for the purposes of disclosure, it will be clear to one of skill in this art who has the benefits of this invention's creative teachings that changes in the preferred products and steps may be made within the scope of the appended claims and without departing from the spirit of the invention. It is realized that changes in the products or methods are possible and it is intended that each element or step recited in any of the following claims and each combination of elements or steps is to be understood as referring to all equivalent elements, steps, or combinations for accomplishing equivalent results in equivalent manner. These claims are intended to cover the invention as broadly as legally possible in whatever form it is utilized.

What we claim is:

1. A method for absorbing oil floating in water, the method comprising the steps of
   introducing absorbent pellets made from paper into the oil,
   the pellets having an irregular shape and a density ranging between about 20 to about 30 pounds of paper per cubic foot of pellets,
   the pellets maintaining their position in the oil while absorbing it,
   introducing a surfactant onto the oil and absorbent pellets to facilitate sinking of the pellets after the pellets have absorbed a major portion of the first liquid,
   the pellets then sinking beneath the oil and into the water, and
   wherein the pellets are made by a process comprising processing the paper into pieces of reduced size,
   spraying the reduced size pieces with water,
   feeding the sprayed pieces to a pelletizing machine which extrudes compressed pellets,
   drying the pellets, and
   feeding the pellets to a roller mill to render the pellets irregular in shape.

2. A method for absorbing a first liquid floating in or on a second liquid, the method comprising the steps of
   introducing into the first liquid absorbent cellulose pellets for absorbing the first liquid,
   the pellets having an irregular shape and a density ranging between about 20 to about 30 pounds of cellulose per cubic foot of pellets,
   the pellets maintaining their position in the first liquid while absorbing it,
   the pellets sinking beneath the first liquid after absorbing some of the first liquid, and
   introducing a surfactant onto the first liquid and absorbent pellets to facilitate sinking of the pellets after the pellets have absorbed an amount of the first liquid.

3. The method of claim 2 including the step of recovering the pellets after they have sunk beneath the first liquid.

4. The method of claim 3 wherein the recovery is effected from a bottom of a reservoir of the second liquid.

5. The method of claim 2 wherein the pellets are made from newsprint paper.

6. The method of claim 5 wherein the pellets are made by a process comprising the steps of
   processing the paper into pieces of reduced size,
   spraying the reduced size pieces with water,
   feeding the sprayed pieces to a pelletizing machine which extrudes compressed pellets,
   drying the pellets, and
   feeding the pellets to a roller mill to render the pellets irregular in shape.

7. The method of claim 6 wherein the reduced size pieces of paper are sprayed with water to achieve a water content of between about 12% to about 14% by weight.

8. The method of claim 6 wherein the extruded compressed pellets, prior to being fed to the roller mill, range in density between about 37 to 47 pounds of paper per cubic foot of pellets.

9. The method of claim 2 wherein the pellets are configured to maintain their position in the first liquid without sinking beneath it until they become substantially saturated with the first liquid.

10. The method of claim 2 wherein the first liquid is crude oil and the second liquid is water.

11. The method of claim 2 wherein the second liquid is water, the first liquid is oil and the pellets include therein biodegrading organisms for degrading the oil.

* * * * *